(No Model.)
F. H. ABELL.
COFFEE POT.
No. 470,798. Patented Mar. 15, 1892.
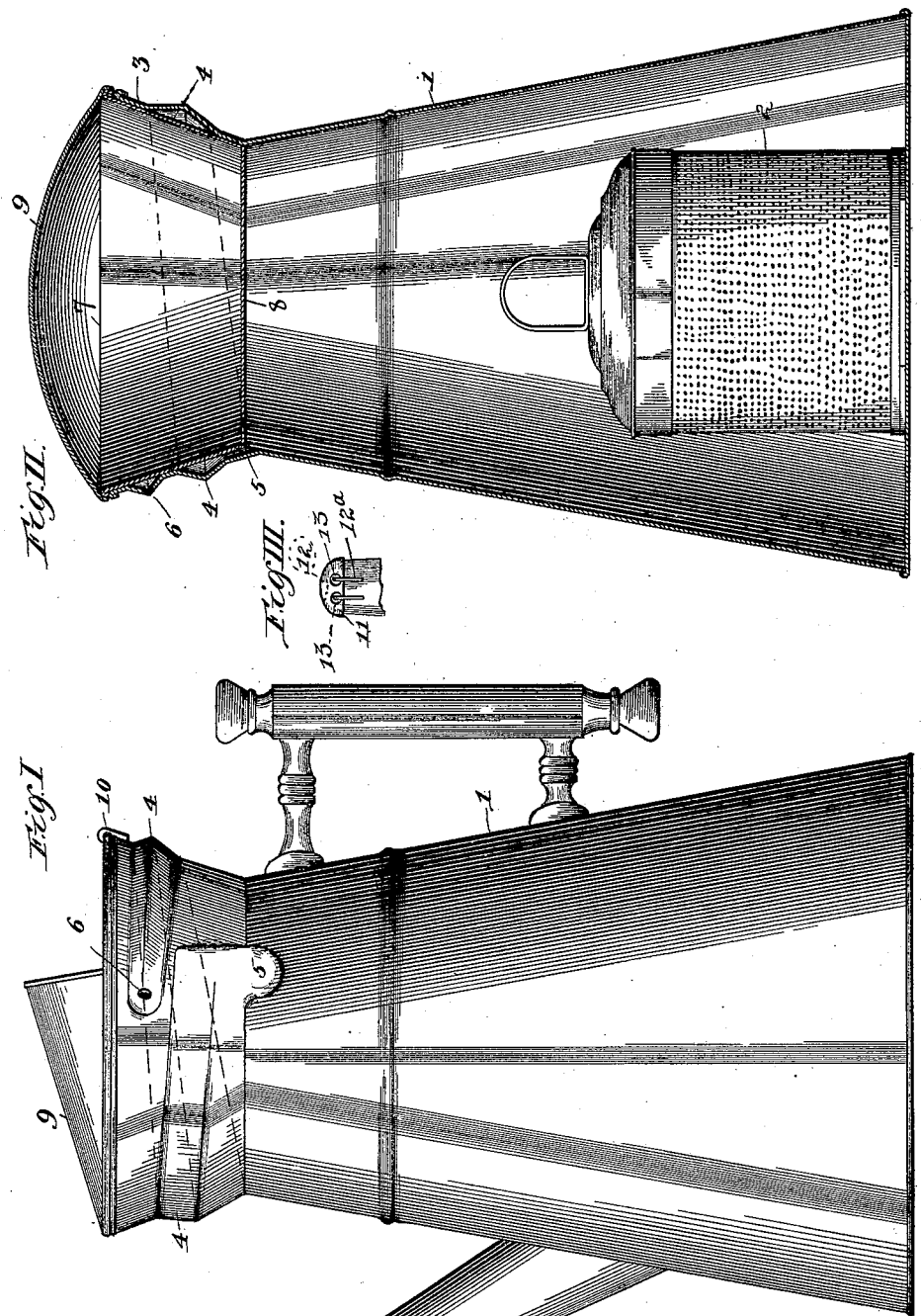
Witnesses.
Inventor.
Francis H. Abell
By Elliott & Onohundro
Attys

UNITED STATES PATENT OFFICE.

FRANCIS H. ABELL, OF GRAND CROSSING, ILLINOIS.

COFFEE-POT.

SPECIFICATION forming part of Letters Patent No. 470,798, dated March 15, 1892.

Application filed September 8, 1891. Serial No. 405,112. (No model.)

*To all whom it may concern:*

Be it known that I, FRANCIS H. ABELL, a citizen of the United States, residing at Grand Crossing, in the county of Cook and State of Illinois, have invented certain new and useful Improvements in Coffee-Pots, of which the following is a full, clear, and exact specification.

My invention relates to that class of coffee-pots designed to condense the steam before the same has an opportunity to escape and to convey the water of condensation back to the coffee. Heretofore it has been sought to attain the desired object by means of a condensing-coil passing through a water-chamber at the upper part of the pot; but such arrangement, beyond being very costly and complicated, and therefore unsuitable as a culinary utensil, is only partially satisfactory, as it collects dirt and is very difficult to clean.

The object of my invention, therefore, is to provide a coffee-pot of this character which shall have no parts to get out of order, even from unusually rough usage, shall be simple of construction and easy of manufacture, readily taken apart and cleaned, and shall effectually perform the desired function.

With these ends in view my invention consists, primarily, in forming a spiral swell or groove or swell or groove of other suitable form in the wall of the pot or in some part in connection therewith and arranging a cold-water cup or chamber in connection with said groove in such a manner as to form a steam-passage around the chamber.

In order, however, that others skilled in the art may make and use my invention, it will now be more fully described in connection with the accompanying drawings, and then particularly pointed out in the claims hereto annexed.

In the said drawings, Figure I is a side elevation of my improved coffee-pot. Fig. II is a vertical section thereof; and Fig. III is a detail view of the spout, showing the manner of attaching the closing cap hereinafter described.

1 is the pot proper, in which the coffee-receptacle 2, of any suitable design, is placed.
On the upper end or top of the pot 1 is formed or screwed a neck or extension 3, which may, if desired, be cylindrical; but I prefer to make it flaring or of inverted frusto-conical form, as shown in the drawings. This neck 3 has formed in its side a spiral groove or channel 4, which starts from a slight swell or cavity 5, formed in the edge of the pot proper just below the neck 3, and extends once, or more if desired, around such neck and terminates at a point near its upper edge, where it is provided with a steam-vent 6 to permit any excess of steam which should not be condensed to escape. This channel 4 may be formed in any suitable manner; but when the pot is composed of metal I prefer to make such channel by producing an outward swell, as shown.

Fitted within the flaring neck 3 and of complementary shape is a water or condensing chamber or cup 7, whose bottom 8 is located just above the lower end of the swell 5. This cup 7 fits snugly within the neck 3, and as it touches the wall of the latter every place except where the groove or channel 4 is formed it is readily seen that a complete channel closed throughout its entire length is formed around the cup while it is in place. The cup is provided with a flaring half-top 9, which prevents the water therein from spilling out when the pot is tipped in pouring the coffee, and the cup may also be provided with a hook or catch 10, adapted to engage over the edge of the neck 3 for guarding against displacement of the cup.

In order that the steam may be compelled to ascend through the channel 4, and thus be condensed by contact with the cold-water cup 7, I provide the pot with a cap 11, which is weighted by means of a drop of solder 12 in its top or elsewhere; or, if made of cast metal, the desired object may be accomplished by thickening the cap at the forward side.

The object in weighting the cap 11 is twofold: First, it holds the spout closed when the pot is not being tipped for pouring, and, second, it holds the cap in its thrown-back position during pouring. I attach the cap to the spout by means of two rings or loops 12ª, which are secured to the spout and pass through two holes 13 in the side of the cap.

It will now be seen that there is no part of my improvements to which access may not be had for cleansing. By removing the cup 7, which is simply set in the neck 3, the whole extent of the interior of the steam-channel 4 is exposed and may be readily subjected to the usual scouring process.

While I have shown and described the groove or steam-channel around the top of the pot as being spiral, it is nevertheless very obvious that such groove might be zigzag, or it might consist of a number of grooves or channels connected together, and, in fact, any other circuitous form of passage would answer the purpose, and hence the modification of the form of groove or channel employed would not involve a departure from the spirit of my invention.

Having described my invention, what I claim, and desire to secure by Letters Patent, is—

1. A coffee-pot having means for preventing the escape of steam, a steam-channel formed in the side thereof and being provided with a small vent, and a condensing cup or chamber fitting over said channel, substantially as set forth.

2. A coffee-pot having a spiral swell, forming a channel or groove in its side, and a condensing-chamber, forming with said groove a continuous steam-passage, substantially as set forth.

3. A coffee-pot having a flaring neck with an open-sided circuitous groove or channel formed therein, and a condensing-cup fitting in said neck and forming with said channel a closed passage for steam, substantially as described.

4. In a coffee-pot, the combination of the pot proper having the flaring neck 3, provided with the circuitous perforated swell 4, the swell 5, and the cup 7, adapted to fit in said neck and form with said swell 4 a continuous steam-passage, substantially as set forth.

5. In a coffee-pot, the combination of the neck 3, having the swell 4, provided with a vent, a condensing-cup adapted to fit within said neck and to form with said swell a continuous steam-passage, the flaring half-cover 9 on said cup, and the retaining-catch 10, substantially as set forth.

6. A coffee-pot having means for closing its spout and a circuitous groove extending around the side of the pot and being provided with a vent, in combination with a condensing-cup fitting in the pot and forming with said groove a steam-escape passage, substantially as set forth.

7. In a coffee-pot, the combination, with the pot proper, of a neck or extension formed on the top thereof and having an open-sided channel formed around it, provided with the escape-vent 6 at its upper end, and a cup fitting in said neck and forming with said channel a passage for steam, substantially as set forth.

FRANCIS H. ABELL.

Witnesses:
 W. R. OMOHUNDRO,
 R. C. OMOHUNDRO.